United States Patent
Zeng et al.

(10) Patent No.: US 9,801,163 B2
(45) Date of Patent: Oct. 24, 2017

(54) UPLINK CONFIGURATION AND TRANSMISSION CONTROL IN INTER-SITE CARRIER AGGREGATION

(75) Inventors: Erlin Zeng, Beijing (CN); Chunyan Gao, Beijing (CN); Haiming Wang, Beijing (CN); Wei Bai, Beijing (CN); Shuang Tan, Beijing (CN); Wei Hong, Beijing (CN); Jing Han, Beijing (CN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 224 days.

(21) Appl. No.: 14/426,888

(22) PCT Filed: Sep. 10, 2012

(86) PCT No.: PCT/CN2012/081182
§ 371 (c)(1),
(2), (4) Date: Mar. 9, 2015

(87) PCT Pub. No.: WO2014/036734
PCT Pub. Date: Mar. 13, 2014

(65) Prior Publication Data
US 2015/0230236 A1    Aug. 13, 2015

(51) Int. Cl.
*H04W 72/04* (2009.01)
*H04W 52/34* (2009.01)
(Continued)

(52) U.S. Cl.
CPC ..... *H04W 72/0413* (2013.01); *H04L 41/0806* (2013.01); *H04W 72/0453* (2013.01);
(Continued)

(58) Field of Classification Search
None
See application file for complete search history.

(56) References Cited

U.S. PATENT DOCUMENTS

2011/0111779 A1*  5/2011  Krishnamurthy ..... H04L 5/0053
                                                            455/501
2011/0188472 A1*  8/2011  Jeon ................. H04W 36/0083
                                                            370/331
(Continued)

FOREIGN PATENT DOCUMENTS

CN    102082643 A    6/2011
CN    102238716 A    11/2011
(Continued)

OTHER PUBLICATIONS

European Search Report dated May 13, 2016, issued in European Patent Application No. 12884133.5.
(Continued)

*Primary Examiner* — Ayaz Sheikh
*Assistant Examiner* — Tarell Hampton
(74) *Attorney, Agent, or Firm* — Oblon, McClelland, Maier & Neustadt, L.L.P.

(57) ABSTRACT

There are provided measures for uplink configuration and transmission control in inter-site carrier aggregation. Such measures may exemplarily comprise measures for controlling configuration of a terminal device for an inter-site carrier aggregation mode, in which carriers from a macro cell and a micro cell are aggregated for uplink communication, with a configuration of uplink control information for the macro cell located at a first site and a configuration of uplink control information for the micro cell located at a second site, and/or measures for controlling transmission of a terminal device in the inter-site carrier aggregation mode with a handling of concurrent uplink transmissions at the terminal device.

20 Claims, 8 Drawing Sheets

(51) Int. Cl.
    *H04W 52/36*    (2009.01)
    *H04W 52/40*    (2009.01)
    *H04W 88/08*    (2009.01)
    *H04L 5/00*     (2006.01)
    *H04L 12/24*    (2006.01)

(52) U.S. Cl.
    CPC ........... *H04L 5/001* (2013.01); *H04W 52/346* (2013.01); *H04W 52/367* (2013.01); *H04W 52/40* (2013.01); *H04W 88/08* (2013.01)

(56) References Cited

U.S. PATENT DOCUMENTS

| | | |
|---|---|---|
| 2011/0312316 A1 | 12/2011 | Baldemair et al. |
| 2013/0259022 A1* | 10/2013 | Jitsukawa ......... H04W 72/0406 370/342 |
| 2015/0131569 A1* | 5/2015 | Rosa .................. H04W 72/042 370/329 |

FOREIGN PATENT DOCUMENTS

| | | | | |
|---|---|---|---|---|
| FI | WO 2013104416 A1 * | 7/2013 | ............ | H04L 5/001 |
| WO | WO 2011/100673 A1 | 8/2011 | | |
| WO | WO 2011/162660 A1 | 12/2011 | | |
| WO | WO 2012/013152 A1 | 2/2012 | | |

OTHER PUBLICATIONS

International Search Report issued Jun. 20, 2013 in PCT/CN2012/081182 Filed Sep. 10, 2012.

* cited by examiner

UPLINK CONFIGURATION AND TRANSMISSION CONTROL IN INTER-SITE CARRIER AGGREGATION

FIELD

The present invention relates to uplink configuration and transmission control in inter-site carrier aggregation. More specifically, the present invention relates to measures (including methods, apparatuses and computer program products) for realizing uplink configuration and transmission control in inter-site carrier aggregation.

BACKGROUND

In the development of wireless and/or cellular communication systems, a focus is on increasing bandwidth and throughput in the radio access network, while enhancing system coverage and performance. In this regard, there are developed carrier aggregation techniques as well as heterogeneous network architectures.

A specific scenario, which is considered to be favorable in view of the above considerations, relates to inter-site carrier aggregation (CA). In the context of 3GPP standardization, i.e. the development of LTE and LTE-A, such inter-site CA scenario could equally be referred to as inter-eNB CA scenario.

In such inter-site (or inter-eNB) scenario, a terminal device such as a user equipment (UE) or the like is served by both a macro or large cell with wide-area coverage, i.e. a macro base station or eNB, and a micro or small cell with local-area coverage, i.e. a micro base station or eNB. Typically, the macro cell is used for handling control plane aspects, such as UE mobility, and the micro cell is used for offloading a large data volume and/or for extending the overall system coverage, while the macro cell and the micro cell operate on different frequencies, e.g. in different frequency bands.

The macro base station or eNB and the micro base station or eNB are located at different sites or locations, and are linked by a backhaul link. While such backhaul link could preferably be implemented without exhibiting any (significant) delay, limited capacity, etc., e.g. by an optical fiber connection, it is typically implemented exhibiting (significant) delay, limited capacity, etc., e.g. by a non-fiber connection in view of cost considerations. A non-ideal (e.g. non-fiber) backhaul link however results in an imperfect connection between macro and micro base stations or eNBs, which exhibits a non-negligible delay, e.g. of more than 1 millisecond.

In order to enable proper operation in any one of the macro and micro cells, uplink control information (UCI) may have to be separately established in both cells. For example, UCI for the macro cell may need to be transmitted in/via the macro cell, and UCI for the micro cell may need to be transmitted in/via the micro cell. This may for example be due to the fact that in/via the macro cell there may be some downlink transmission such as PDSCH, which requires CSI feedback to aid scheduling or ACK feedback for the sake of downlink HARQ.

In view thereof, one issue exemplarily arising in such inter-site (or inter-eNB) scenario relates to an UCI configuration, i.e. a configuration of UCI parameters. In particular, an appropriate UCI configuration, i.e. the configuration of UCI parameters, for the micro cell is to be achieved.

In this regard, UCI inter-cell interference might occur. While inter-cell interference coordination for UCI is currently done via Cyclic Shift Hopping to randomize the inter-cell interference, such approach may not be effective in an inter-site (or inter-eNB) scenario, especially in a scenario with a dense micro cell deployment, for example.

In view thereof, another issue exemplarily arising in such inter-site (or inter-eNB) scenario relates UCI inter-cell interference. In particular, an appropriate handling of UCI configurations is to be achieved in order to prevent or at least reduce inter-cell interference between UCI for the macro cell and UCI the micro cell.

Since layer 1 processing such as PDSCH and PUSCH scheduling may be done separately in/via the macro and micro cells, it may be not possible to have a fast inter-cell coordination to avoid concurrent transmissions in/via the macro cell and the micro cell. For example, if the UE applies power scaling on some uplink signals due to such concurrent transmissions, the eNBs in/via the macro and micro cells may not be aware of this due to the separate scheduling. The latter makes uplink detection as well as scheduling/link adaption more difficult and may impact the uplink performance, for example.

In view thereof, still another issue exemplarily arising in such inter-site (or inter-eNB) scenario relates to the difficulty in handling concurrent uplink transmissions in/via the macro cell and the micro cell. In particular, even without availability of a fast inter-cell coordination (e.g. layer 1-based coordination such as joint scheduling), an appropriate solution for concurrent uplink transmissions in/via the macro and micro cells is to be achieved.

Thus, there is a need to further improve uplink configuration and transmission control in inter-site carrier aggregation.

SUMMARY

Various example embodiments of the present invention aim at addressing at least part of the above issues and/or problems and drawbacks.

Various aspects of example embodiments of the present invention are set out in the appended claims.

According to an example aspect of one or more embodiments of the present invention, there is provided a method comprising setting a configuration of uplink control information for a macro cell located at a first site, and signaling, via the macro cell, the configuration of uplink control information for the macro cell and configuration information for a micro cell located at a second site to a terminal device for an inter-site carrier aggregation mode in which carriers from the macro cell and the micro cell are aggregated for uplink communication.

According to an example aspect of one or more embodiments of the present invention, there is provided a method comprising setting a configuration of uplink control information for a micro cell located at a second site, and signaling the configuration of uplink control information for the micro cell for configuring a terminal device for an inter-site carrier aggregation mode in which carriers from a macro cell located at a first site and the micro cell are aggregated for uplink communication.

According to an example aspect of one or more embodiments of the present invention, there is provided a method comprising obtaining, in a macro cell located at a first site, configuration of uplink control information for the macro cell and configuration information for a micro cell located at a second site, and configuring an inter-site carrier aggregation mode on the basis of the obtained configuration of uplink control information for the macro cell and the obtained configuration information for the micro cell.

According to an example aspect of one or more embodiments of the present invention, there is provided a method comprising coordinating restriction of time resources for an uplink transmission from a terminal device in a first cell located at a first site and a second cell located at a second site for the terminal device operating in an inter-site carrier aggregation mode, in which carriers from the first cell and the second cell are aggregated for uplink communication, such that the time resources for an uplink transmission in the first and second cells are not concurrent, and scheduling the terminal device for an uplink transmission in at least one of the first and second cells on the basis of the coordinated time resource restriction.

According to an example aspect of one or more embodiments of the present invention, there is provided a method comprising determining exceedance of an uplink transmission power limitation by concurrent uplink transmissions on aggregated carriers from a first cell located at a first site and the second cell located at a second cell in an inter-site carrier aggregation mode in which carriers from the first cell and the second cell are aggregated for uplink communication, and dropping an uplink transmission in one of the first and second cells.

According to an example aspect of one or more embodiments of the present invention, there is provided an apparatus comprising at least one processor, at least one memory including computer program code, and at least one interface configured for communication with at least another apparatus, the at least one processor, with the at least one memory and the computer program code, being configured to cause the apparatus to perform: setting a configuration of uplink control information for a macro cell located at a first site, and signaling, via the macro cell, the configuration of uplink control information for the macro cell and configuration information for a micro cell located at a second site to a terminal device for an inter-site carrier aggregation mode in which carriers from the macro cell and the micro cell are aggregated for uplink communication.

According to an example aspect of one or more embodiments of the present invention, there is provided an apparatus comprising at least one processor, at least one memory including computer program code, and at least one interface configured for communication with at least another apparatus, the at least one processor, with the at least one memory and the computer program code, being configured to cause the apparatus to perform: setting a configuration of uplink control information for a micro cell located at a second site, and signaling the configuration of uplink control information for the micro cell for configuring a terminal device for an inter-site carrier aggregation mode in which carriers from a macro cell located at a first site and the micro cell are aggregated for uplink communication.

According to an example aspect of one or more embodiments of the present invention, there is provided an apparatus comprising at least one processor, at least one memory including computer program code, and at least one interface configured for communication with at least another apparatus, the at least one processor, with the at least one memory and the computer program code, being configured to cause the apparatus to perform: obtaining, in a macro cell located at a first site, configuration of uplink control information for the macro cell and configuration information for a micro cell located at a second site, and configuring an inter-site carrier aggregation mode on the basis of the obtained configuration of uplink control information for the macro cell and the obtained configuration information for the micro cell.

According to an example aspect of one or more embodiments of the present invention, there is provided an apparatus comprising at least one processor, at least one memory including computer program code, and at least one interface configured for communication with at least another apparatus, the at least one processor, with the at least one memory and the computer program code, being configured to cause the apparatus to perform: coordinating restriction of time resources for an uplink transmission from a terminal device in a first cell located at a first site and a second cell located at a second site for the terminal device operating in an inter-site carrier aggregation mode, in which carriers from the first cell and the second cell are aggregated for uplink communication, such that the time resources for an uplink transmission in the first and second cells are not concurrent, and scheduling the terminal device for an uplink transmission in at least one of the first and second cells on the basis of the coordinated time resource restriction.

According to an example aspect of one or more embodiments of the present invention, there is provided an apparatus comprising at least one processor, at least one memory including computer program code, and at least one interface configured for communication with at least another apparatus, the at least one processor, with the at least one memory and the computer program code, being configured to cause the apparatus to perform: determining exceedance of an uplink transmission power limitation by concurrent uplink transmissions on aggregated carriers from a first cell located at a first site and the second cell located at a second cell in an inter-site carrier aggregation mode in which carriers from the first cell and the second cell are aggregated for uplink communication, and dropping an uplink transmission in one of the first and second cells.

According to an example aspect of one or more embodiments of the present invention, there is provided an apparatus comprising means for setting a configuration of uplink control information for a macro cell located at a first site, and means for signaling, via the macro cell, the configuration of uplink control information for the macro cell and configuration information for a micro cell located at a second site to a terminal device for an inter-site carrier aggregation mode in which carriers from the macro cell and the micro cell are aggregated for uplink communication.

According to an example aspect of one or more embodiments of the present invention, there is provided an apparatus comprising means for setting a configuration of uplink control information for a micro cell located at a second site, and means for signaling the configuration of uplink control information for the micro cell for configuring a terminal device for an inter-site carrier aggregation mode in which carriers from a macro cell located at a first site and the micro cell are aggregated for uplink communication.

According to an example aspect of one or more embodiments of the present invention, there is provided an apparatus comprising means for obtaining, in a macro cell located at a first site, configuration of uplink control information for the macro cell and configuration information for a micro cell located at a second site, and means for configuring an inter-site carrier aggregation mode on the basis of the obtained configuration of uplink control information for the macro cell and the obtained configuration information for the micro cell.

According to an example aspect of one or more embodiments of the present invention, there is provided an apparatus comprising means for coordinating restriction of time resources for an uplink transmission from a terminal device in a first cell located at a first site and a second cell located at a second site for the terminal device operating in an inter-site carrier aggregation mode, in which carriers from the first cell and the second cell are aggregated for uplink communication, such that the time resources for an uplink transmission in the first and second cells are not concurrent, and means for scheduling the terminal device for an uplink transmission in at least one of the first and second cells on the basis of the coordinated time resource restriction.

According to an example aspect of one or more embodiments of the present invention, there is provided an apparatus comprising means for determining exceedance of an uplink transmission power limitation by concurrent uplink transmissions on aggregated carriers from a first cell located at a first site and the second cell located at a second cell in an inter-site carrier aggregation mode in which carriers from the first cell and the second cell are aggregated for uplink communication, and means for dropping an uplink transmission in one of the first and second cells.

According to an example aspect of one or more embodiments of the present invention, there is provided an computer program product comprising computer-executable computer program code which, when the program is run on a computer (e.g. of an apparatus according to any one of the aforementioned apparatus-related example aspects of one or more embodiments of the present invention), is configured to cause the computer to carry out the method according to any one of the aforementioned method-related example aspects of one or more embodiments of the present invention.

Such computer program product may comprise or be embodied as a (tangible) computer-readable (storage) medium or the like on which the computer-executable computer program code is stored, and/or the program may be directly loadable into an internal memory of the computer or a processor thereof.

Further developments or modifications of one or more embodiments of the any one of the aforementioned example aspects of the present invention are set out in the following.

By virtue of the aforementioned example aspects of one or more embodiments of the present invention, there may be provided an improved uplink configuration and transmission control in inter-site carrier aggregation.

By way of example embodiments of the present invention, there may for example be provided measures for controlling configuration of a terminal device for an inter-site carrier aggregation mode and/or measures for controlling transmission of a terminal device in the inter-site carrier aggregation mode. Thereby, there may for example be achieved at least one of an appropriate UCI configuration, i.e. the configuration of UCI parameters, for the micro cell, an appropriate handling of UCI configurations in order to prevent or at least reduce inter-cell interference between UCI for the macro cell and UCI the micro cell, and an appropriate handling of concurrent uplink transmissions in/via the macro and micro cells even without availability of a fast inter-cell coordination.

Thus, for example, enhancements may be achieved by methods, apparatuses and computer program products enabling/realizing uplink configuration and transmission control in inter-site carrier aggregation.

BRIEF DESCRIPTION OF DRAWINGS

For a more complete understanding of some example embodiments of the present invention, reference is now made to the following description taken in connection with the accompanying drawings in which.

DESCRIPTION OF EXAMPLE EMBODIMENTS

Example aspects of the present invention will be described herein below. More specifically, some example aspects of the present are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the examples and example embodiments of the present invention mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, a LTE/LTE-Advanced communication system is used as a non-limiting example for the applicability of thus described example embodiments. As such, the description of example embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

In particular, some embodiments of the present invention may be applicable in any communication system and/or network deployment with an inter-site carrier aggregation scenario.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

According to example embodiments of the present invention, in general terms, there are provided mechanisms, measures and means for enabling/realizing uplink configuration and transmission control in inter-site carrier aggregation.

In the following, example embodiments of the present invention are described with reference to methods, procedures and functions, as well as with reference to structural arrangements and configurations.

Figure 1:
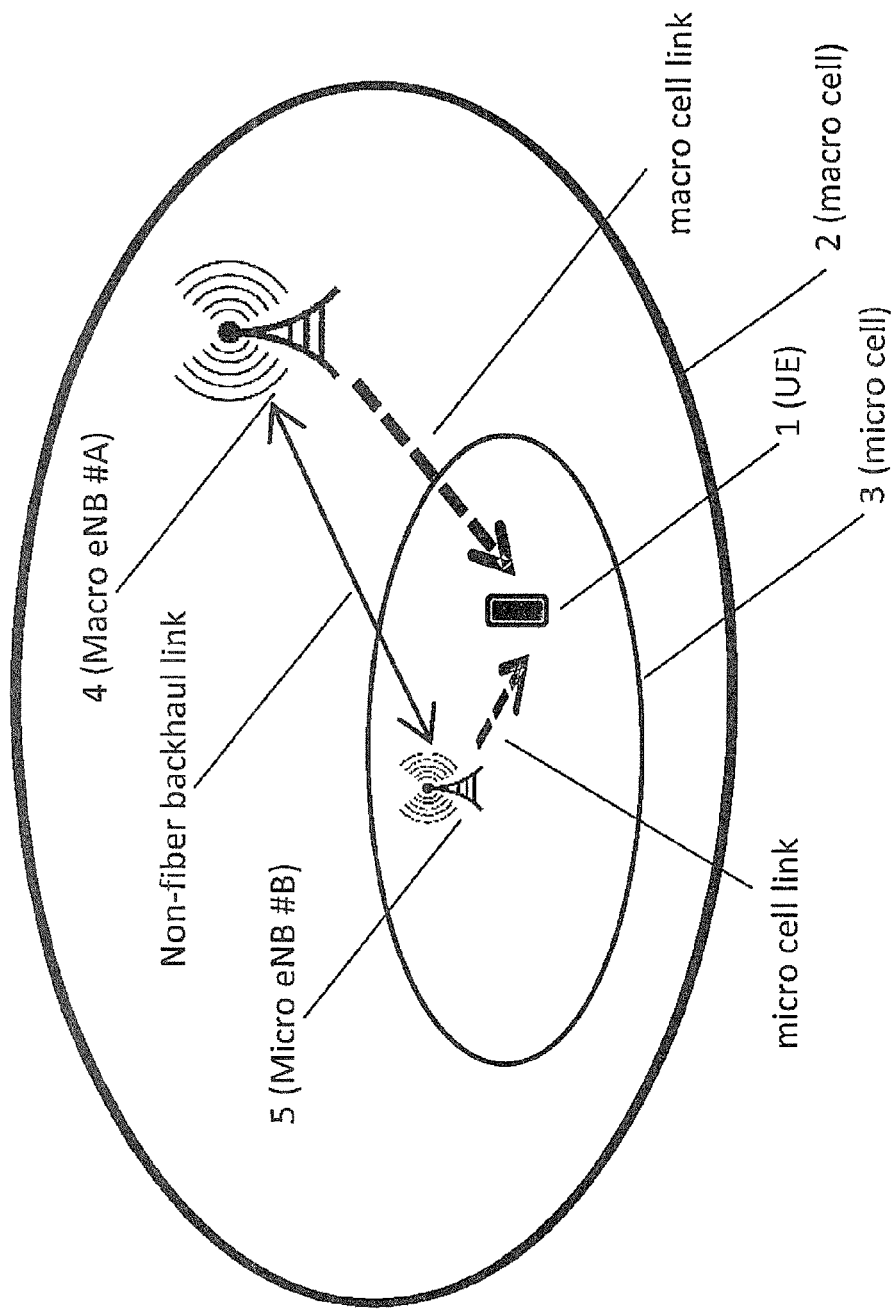
FIG. 1 shows a schematic diagram illustrating an inter-site carrier aggregation scenario, for which some example embodiments of the present invention are applicable.

FIG. 1 shows a schematic diagram illustrating an inter-site carrier aggregation scenario, for which some example embodiments of the present invention are applicable.

The inter-site carrier aggregation scenario of FIG. 1 corresponds to the inter-site carrier aggregation scenario as described above. Namely, a UE 1 resides both in a macro cell 2 and a micro cell 3 and is thus served by both a macro eNB #A 4 and a micro eNB #B 5. The macro eNB #A and the micro eNB #B are located a different sites, and are connected by a backhaul link. The backhaul link may be a non-ideal link exhibiting a (significant) delay of e.g. more than 1 millisecond, limited capacity, e.g., which may for example be implemented by a non-fiber link. In the macro cell and the micro cell, different operating frequencies are used, and UCI configurations are to be separately established, i.e. UCIs are to be separately transmitted, in both cells.

The thus illustrated inter-site carrier aggregation scenario could be regarded as a heterogeneous network deployment, and could also be referred as multiflow scenario or a dual connectivity scenario, as the UE may have multiple traffic flows or dual connectivity in the two cells, i.e. over the macro eNB #A and the micro eNB #B. The illustrated macro eNB #A could also be referred to as a wide-area node, a large cell node, an anchor node, or the like, while the illustrated micro eNB #B could also be referred to as a local-area node, a small cell node, a pico (cell) node, a booster node, or the like. The backhaul link may for example be implemented by an X2 interface.

In such inter-site carrier aggregation scenario, the UE may operate in an inter-site carrier aggregation mode in which carriers from the macro cell and the micro cell are aggregated for uplink communication. Accordingly, the macro cell and the micro cell represent aggregated cells from the perspective of the UE.

In the following, the inter-site carrier aggregation scenario of FIG. 1 is adopted as an exemplary basis for the description of some embodiments of the present invention.

Figure 2:
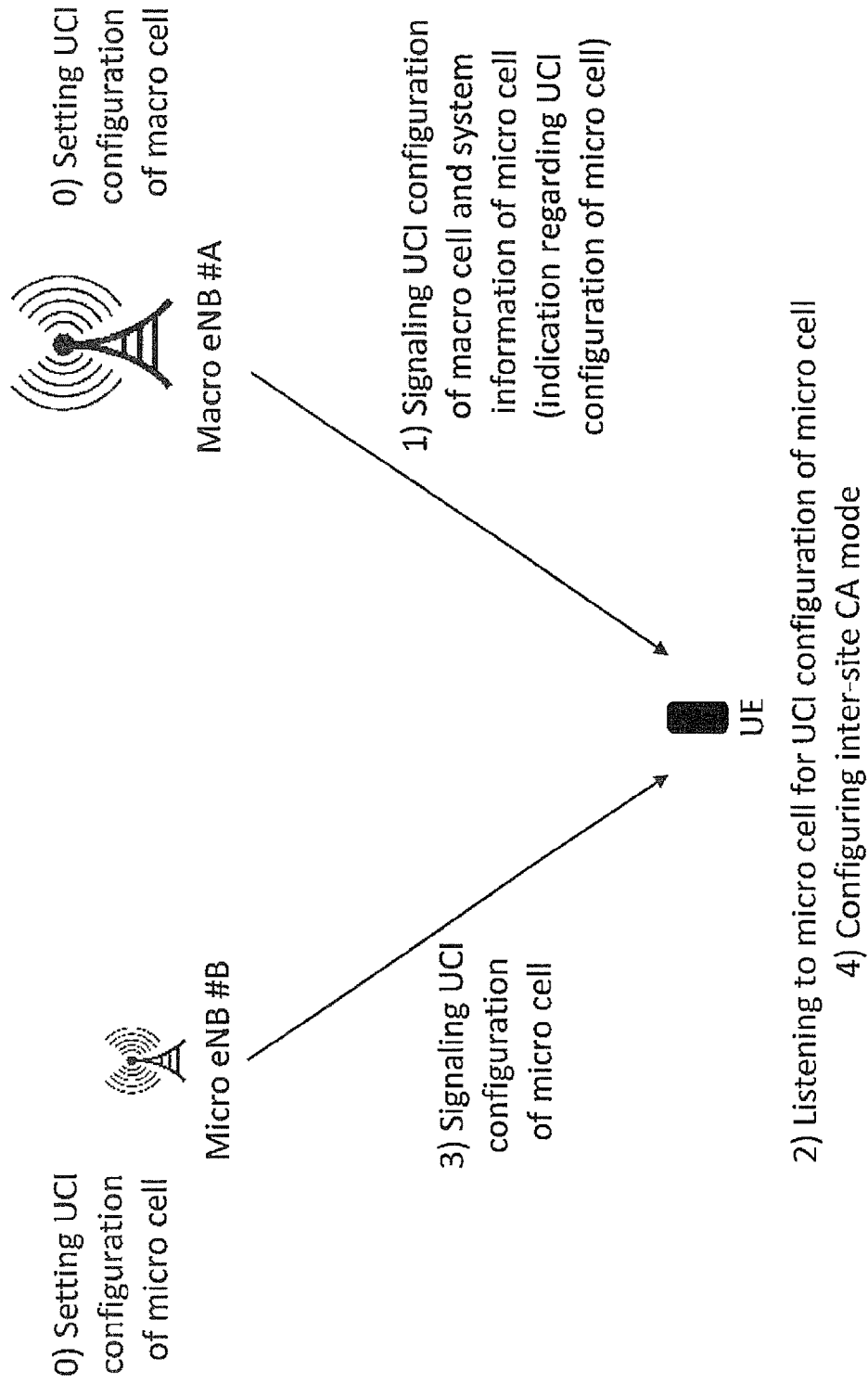
FIG. 2 shows a schematic diagram illustrating a first example procedure of UCI configuration in an inter-site carrier aggregation scenario according to some example embodiments of the present invention.
Figure 3:
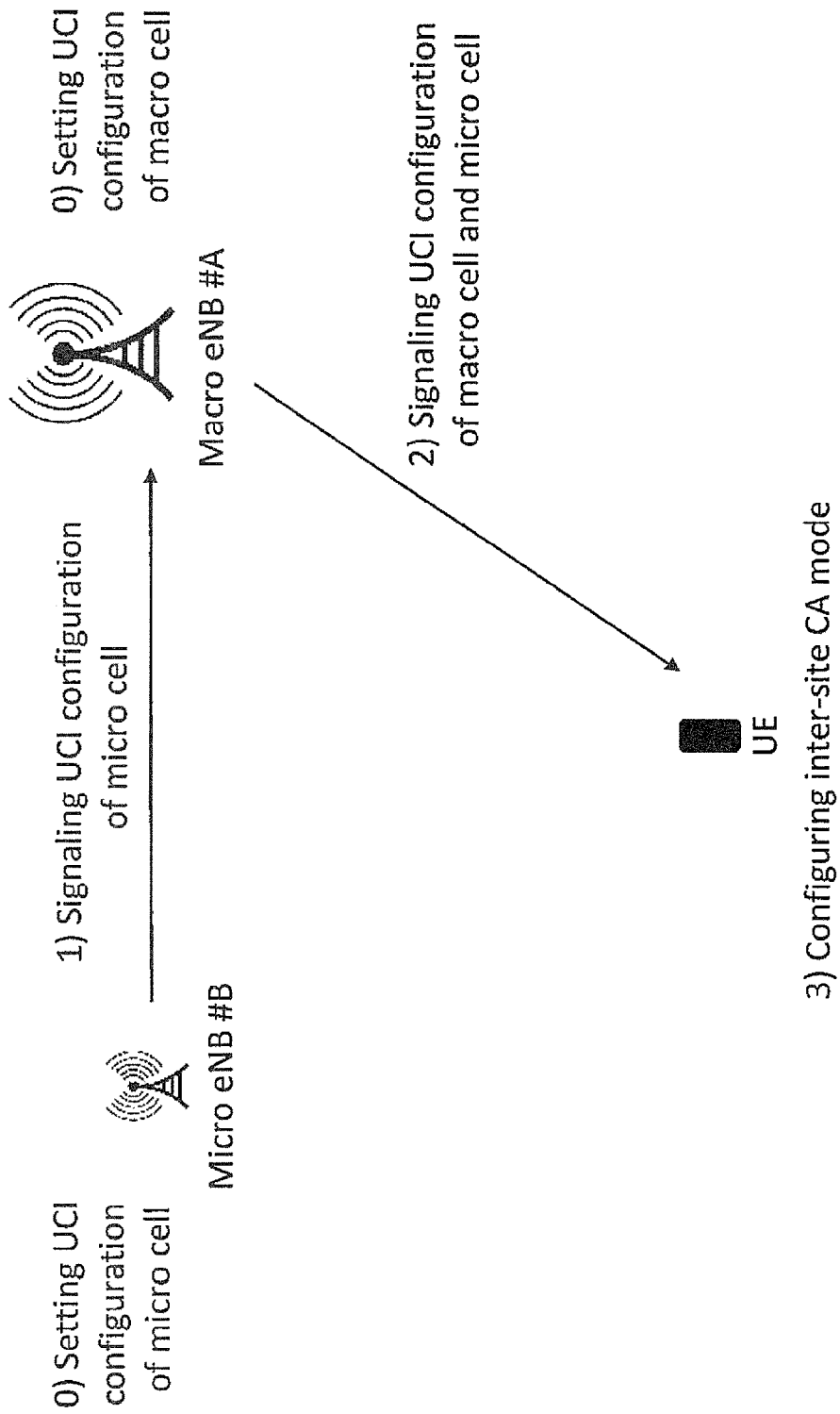
FIG. 3 shows a schematic diagram illustrating a second example procedure of UCI configuration in an inter-site carrier aggregation scenario according to some example embodiments of the present invention.

FIGS. 2 and 3 below relate to measures for controlling configuration of a terminal device for an inter-site CA mode, specifically an appropriate UCI configuration, i.e. the configuration of UCI parameters, for the micro cell. Namely, measures are provided for enabling the UE (in the inter-site CA mode) to know the UCI configuration for the micro cell, thereby enabling the UE's UCI transmissions in/via the micro cell.

In this regard, the UCI may comprise at least one of one or more parameters of a PUCCH, a periodic CSI mode, and an ACK mode of a HARQ. Accordingly, the UCI configurations may include various parameters such as PUCCH parameters (e.g. sequence, UE-specific resource offset, etc.), periodic CSI mode (e.g. mode, periodicity etc.), HARQ ACK mode (e.g. PUCCH format 1b or format 3, etc.), or the like.

FIG. 2 shows a schematic diagram illustrating a first example procedure of UCI configuration in an inter-site carrier aggregation scenario according to some example embodiments of the present invention.

As a precondition, in phase 0, an UCI configuration for the macro cell is set in the macro cell, i.e. at the macro eNB #A, and an UCI configuration for the micro cell is set in the micro cell, i.e. at the micro eNB #B. Further, it is assumed that the UE is connected to the macro eNB #A.

Then, in phase 1, the UCI configuration for the macro cell and configuration information for the micro cell are signaled to the UE in/via the macro cell by the macro eNB #A. In this regard, the configuration information for the micro cell comprises system information of the micro cell, e.g. cell ID, system bandwidth, etc., and the downlink signaling comprises an indication for the UE to obtain an UCI configuration for the micro cell in/via the micro cell. Such indication may be implicit, such as by reception of the signaling of the aforementioned contents as such, or explicit, such as a distinct downlink signaling which may e.g. relate to the entry of the inter-site CA mode at the UE (as exemplified in FIG. 4 below).

Upon obtaining the downlink signaling in/via the macro cell, the UE configures the inter-site carrier aggregation mode on the basis of the obtained UCI configuration for the macro cell and the obtained configuration information for the micro cell. In this regard, the UE may (switch to) listen to the micro cell for an UCI configuration for the micro cell on the basis of the corresponding (implicit or explicit) indication in/via the macro cell (phase 2), and may obtain the UCI configuration for the micro cell by way of a downlink signaling in/via the micro cell (phase 3). This is because the UCI configuration for the micro cell is signaled to the UE in/via the micro cell by the micro eNB #B. Then, in phase 4, the UE may configure the inter-site CA mode accordingly, i.e. with the UCI configuration for the micro cell (in addition to the previously obtained UCI configuration for the macro cell).

Accordingly, the example procedure of FIG. 2 represents a two-step UCI configuration approach from the perspective of the UE. In a first step, downlink signaling in/via the macro cell is used to configure the UE to inter-eNB CA mode, and part of the micro cell system information is signaled via downlink signaling in/via the macro cell. In a second step, other micro cell system information and UE-specific UCI configuration is signaled via a micro cell downlink signaling. The UE determines that it shall behave according to the second step, i.e. to obtain the UCI configuration for the micro cell in/via the micro cell, based on explicit signaling in/via the macro downlink signaling or implicitly upon reception of the information in/via the macro cell in the first step, as outlined above.

According to some example embodiments of the present invention, a signaling (e.g. an RRC signaling) in/via the micro cell can be used to convey the UCI configuration for the micro cell to the UE for its inter-site CA mode.

FIG. 3 shows a schematic diagram illustrating a second example procedure of UCI configuration in an inter-site carrier aggregation scenario according to some example embodiments of the present invention.

As a precondition, in phase 0, an UCI configuration for the macro cell is set in the macro cell, i.e. at the macro eNB #A, and an UCI configuration for the micro cell is set in the micro cell, i.e. at the micro eNB #B. Further, it is assumed that the UE is connected to the macro eNB #A.

Then, in phase 1, the UCI configuration for the micro cell is signaled from the micro cell to the macro cell (by the micro eNB #B) and obtained at the macro cell (by the macro eNB #A). This may be accomplished via an inter-cell connection such as the backhaul link. In phase 2, the UCI configuration for the macro cell and the UCI configuration for the micro cell (representing corresponding configuration information for the micro cell) are signaled to the UE in/via the macro cell by the macro eNB #A. Upon obtaining the downlink signaling in/via the macro cell, which comprises the UCI configuration for the macro cell and the micro cell, the UE configures the inter-site carrier aggregation mode accordingly (phase 3).

Accordingly, the example procedure of FIG. 3 represents a one-step UCI configuration approach from the perspective of the UE. In a single step, downlink signaling in/via the macro cell is used to configure the UE to inter-eNB CA mode with the UCI configuration for the macro cell and the micro cell. To this end, the micro cell shares its UCI configuration regarding the UE with the macro cell via some inter-eNB interface. For example, such approach may be useful when the micro cell is serving, in addition to the UE in the inter-site CA mode, some other UEs in a standalone carrier type mode, or is serving other legacy UEs in its frequency band.

According to some example embodiments of the present invention, a signaling (e.g. an RRC signaling) in/via the macro cell can be used to convey the UCI configuration for the micro cell (in addition to the UCI configuration for the macro cell) to the UE for its inter-site CA mode.

A control of configuration of a terminal device for an inter-site CA mode according to some example embodiments of the present invention, as exemplified in FIGS. 2 and 3 above, could be performed when the UE enters the inter-site CA mode.

Figure 4:
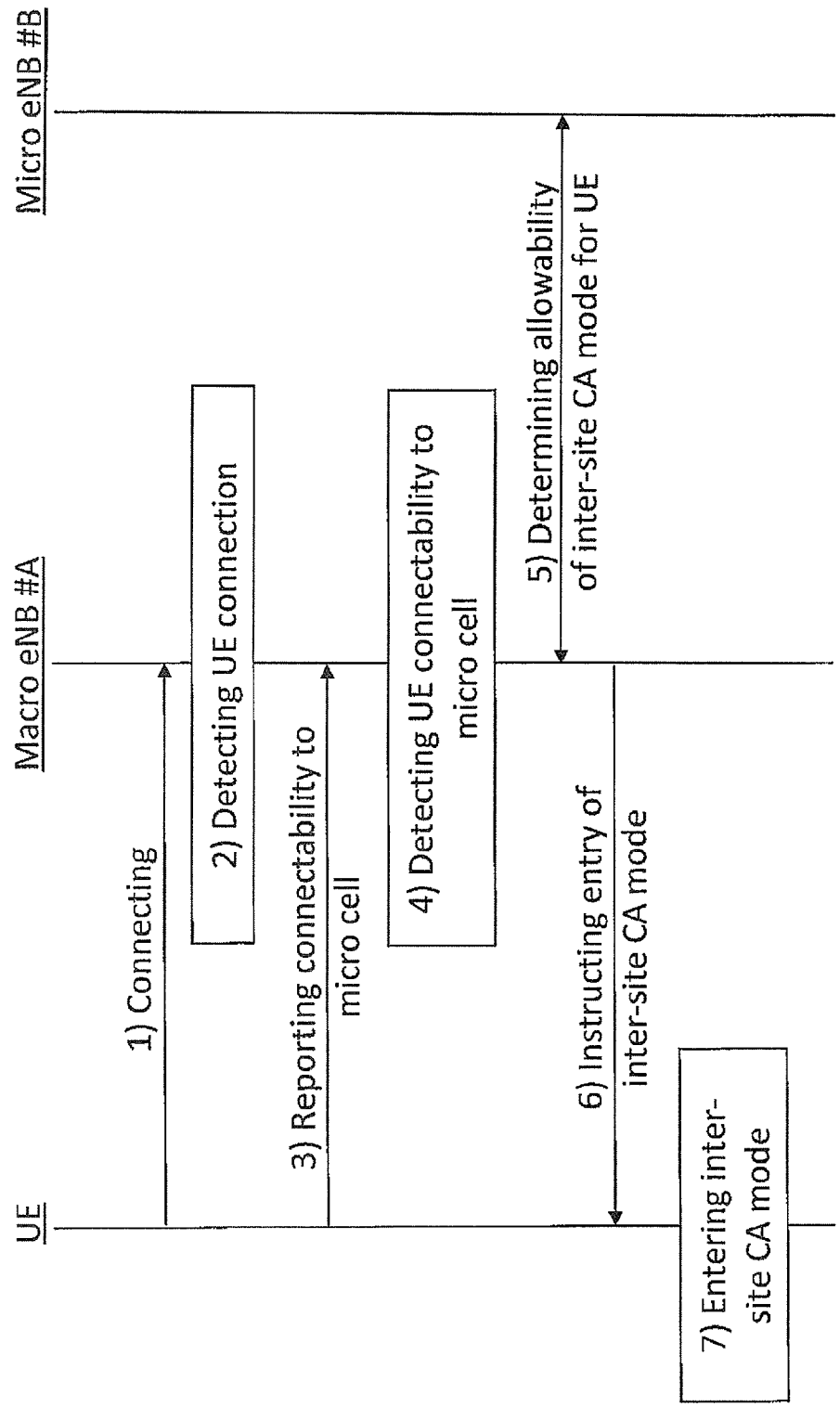
FIG. 4 shows a signaling diagram illustrating an example procedure of an inter-site carrier aggregation mode entry in an inter-site carrier aggregation scenario according to some example embodiments of the present invention.

FIG. 4 shows a signaling diagram illustrating an example procedure of an inter-site carrier aggregation mode entry in an inter-site carrier aggregation scenario according to some example embodiments of the present invention.

As shown in FIG. 4, an example procedure of the entry of the UE in the inter-site CA mode may comprise the following operations. In a first step, the UE connects to the macro cell, i.e. the macro eNB #A (operation 1), whereupon the macro eNB #A detects the connection of the UE to the macro cell (operation 2). In a second step, assuming that the UE moves close enough to the micro cell or its micro eNB #B so as to have connectability thereto, the UE reports to the macro eNB #A its connectability to the micro cell (operation 3), whereupon the macro eNB #A detects the connectability of the UE to the micro cell (operation 4). In a third step, the macro eNB #A determines allowability of the inter-site CA mode for the UE with the micro cell, i.e. the micro eNB #B (operation 5). That is, the macro eNB #A has some coordination, e.g. over an X2 interface, with the micro eNB #B, and determines that the UE is allowed to enter the inter-site CA mode. Otherwise, in the context of such coordination between macro eNB #A and micro eNB #B, it may be the micro eNB #B that determines the allowability of the inter-site CA mode for the UE, whereupon the micro eNB #B notifies the macro eNB #A of such allowability determination. Thereupon, in a fourth step, the macro cell, i.e. the macro eNB #A, instructs the UE to enter the inter-site CA mode (with cells #A and #B as aggregated cells) via a downlink signaling in/via the macro cell (operation 6), and the UE enters the inter-site CA mode upon obtaining such entry instruction (operation 7).

Accordingly, the entry of the inter-site CA mode by the UE is eventually initiated by a signaling (e.g. an RRC signaling) in/via the macro cell. Such signaling may be used as the explicit indication for the UE to obtain an UCI configuration for the micro cell in/via the micro cell, as mentioned in the context of phase 1 in the procedure of FIG. 2.

Figure 5:
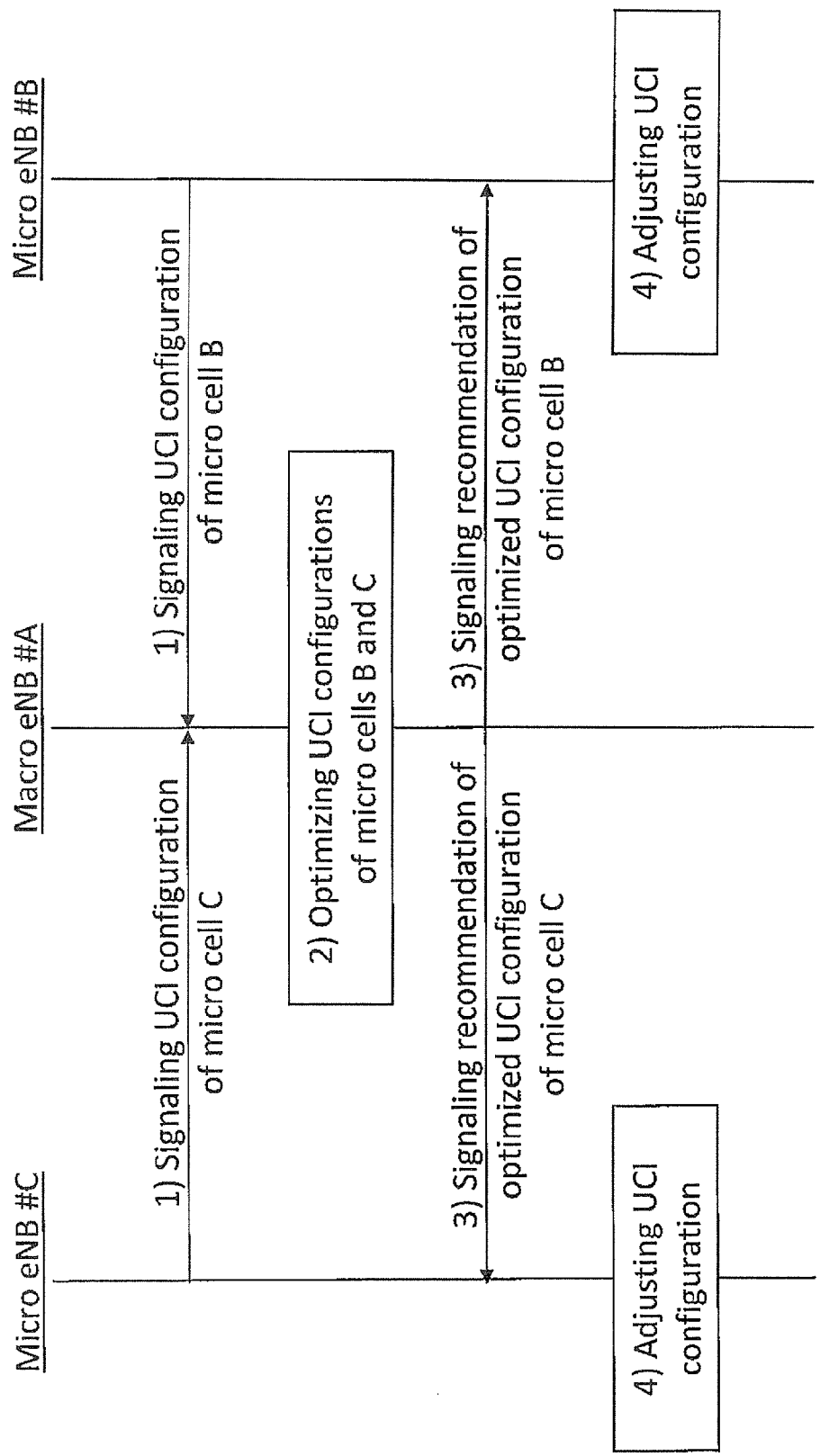
FIG. 5 shows a signaling diagram illustrating an example procedure of UCI inter-cell interference coordination in an inter-site carrier aggregation scenario according to some example embodiments of the present invention.

FIG. 5 below relates to measures for controlling configuration of a terminal device for an inter-site CA mode, specifically an appropriate handling of UCI configurations in order to prevent or at least reduce inter-cell interference between UCI for the macro cell and UCI the micro cell. Namely, measures are provided for enabling a plurality of micro cells (being aggregated with a common macro cell) to know optimized UCI configurations for a respective UE (in the inter-site CA mode), thereby mitigating UCI inter-cell interference in the aggregated cells.

FIG. 5 shows a signaling diagram illustrating an example procedure of UCI inter-cell interference coordination in an inter-site carrier aggregation scenario according to some example embodiments of the present invention.

As shown in FIG. 5, an example procedure of UCI inter-cell interference coordination may comprise the following operations, wherein en exemplary case of micro cells #B and #C being commonly aggregated with macro cell #A is assumed. It is noted that such example case is non-limiting but for the sake of simplicity only, while some embodiments of the present invention are also applicable with different configurations of aggregated cells, such as more than two micro cells.

In a first step, plural micro eNBs such as e.g. micro eNBs #B and #C, signal their UCI configurations to the macro cell, i.e. the macro eNB #A, respectively. Accordingly, the macro eNB #A obtains the UCI configurations for the plural micro cells. In a second step, the macro eNB #A optimizes the plural UCI configurations for the plural micro cells in terms of minimizing uplink interference among the micro cells. In this regard, the UCI configurations of the micro cells are controlled so as to be coordinated in view of the fact that the micro cells operate on the same frequency. Further, the UCI configuration for the macro cell may be taken into consideration in the optimization/coordination as well. As a result of the optimization/coordination, respective recommendations of optimized UCI configurations for the micro cells are derived. In a third step, the macro eNB #A signals the recommendation of optimized UCI configurations for the micro cells to the micro cells, respectively. When obtaining its optimized UCI configuration for the micro cell, each micro cell may adjust its UCI configuration accordingly in a fourth step. The thus adjusted UCI configuration for the micro cell may then be used by the respective micro eNB in a subsequent procedure of controlling configuration of a terminal device for an inter-site CA mode according to some example embodiments of the present invention, as exemplified in FIGS. 2 and 3 above.

In the example procedure of FIG. 3 above, the UCI configuration for a micro cell is shared with the macro cell anyway. Accordingly, multiple neighboring micro cells may here share their UCI configuration information with the macro cell respectively. In the example procedure of FIG. 2 above, in addition to the phases/operations exemplarily illustrated, it is also possible that one or multiple neighboring micro cells share their UCI configuration information with the macro cell respectively. Then, the macro cell can make use of such UCI configuration information and optimize the configurations to minimize the uplink interference among the small cells in the same frequency. In both cases, the macro cell can thus give the micro cells recommendations of optimized UCI configuration information for inter-ference coordination. The recommendations may comprise parameters such as indicated above, such as PUCCH parameters (e.g. sequence, UE-specific resource offset, etc.), periodic CSI mode (e.g. mode, periodicity etc.), HARQ ACK mode (e.g. PUCCH format 1b or format 3, etc.), or the like.

Figure 6:
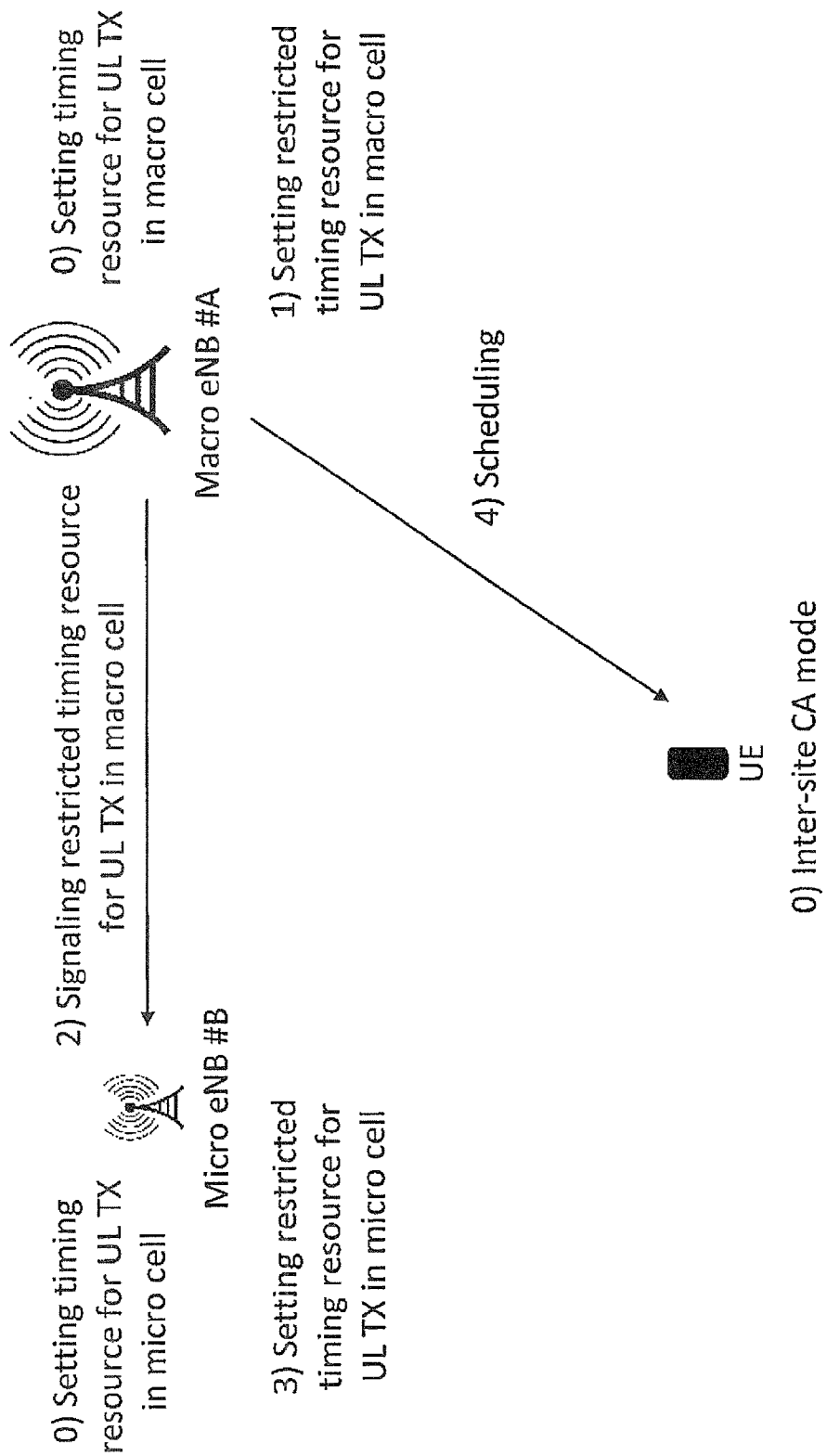
FIG. 6 shows a schematic diagram illustrating a first example procedure relating to concurrent uplink transmissions in an inter-site carrier aggregation scenario according to some example embodiments of the present invention.
Figure 7:
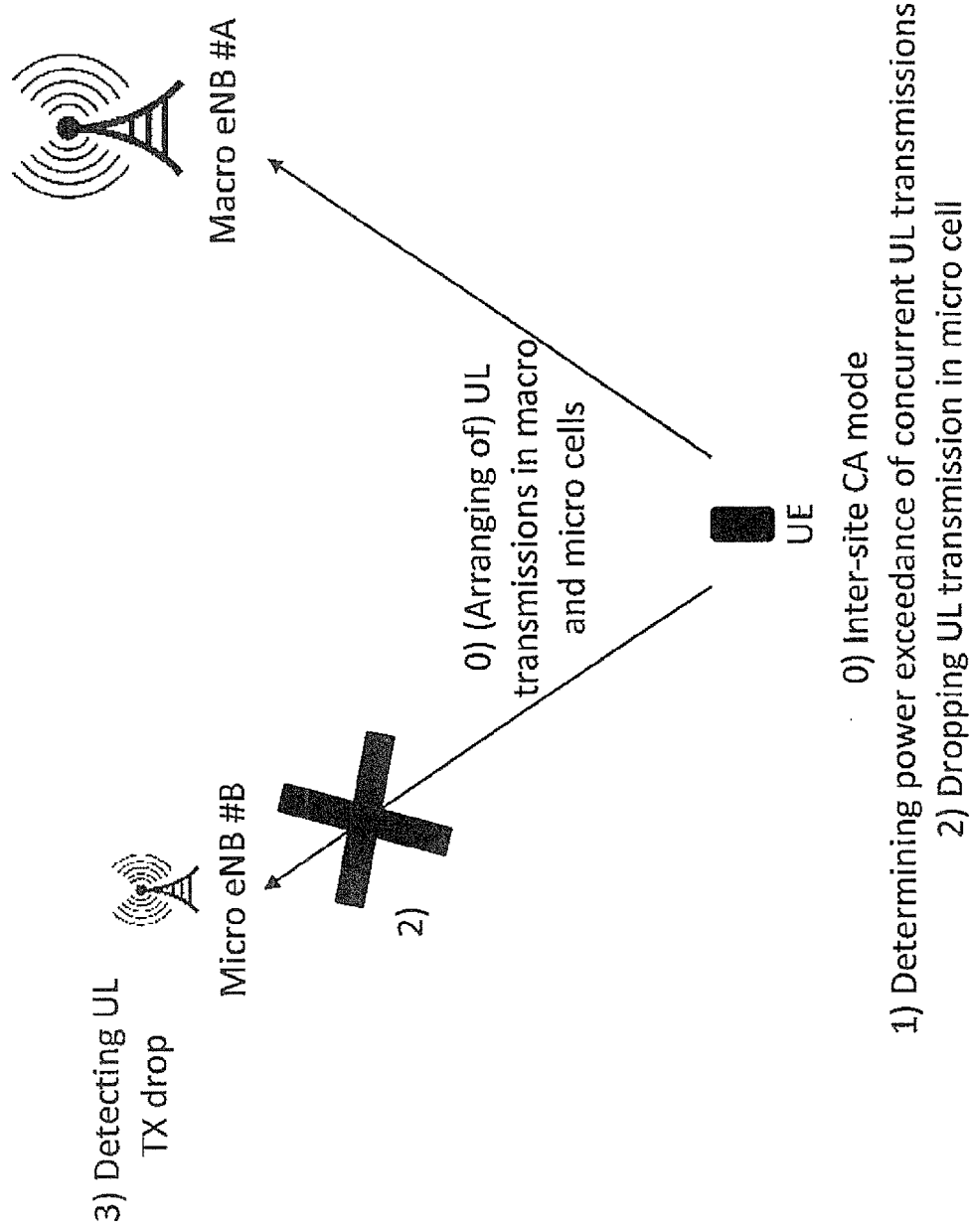
FIG. 7 shows a schematic diagram illustrating a second example procedure relating to concurrent uplink transmissions in an inter-site carrier aggregation scenario according to some example embodiments of the present invention.

FIGS. 6 and 7 below relate to measures for controlling transmission of a terminal device in the inter-site carrier aggregation mode, which may be useful as a solution for concurrent uplink transmissions in/via the macro and micro cells even without availability of a fast inter-cell coordination.

In this regard, concurrent uplink transmissions in/via the macro and micro cells are handled in view of the fact that in practice a terminal device has a maximum uplink power limitation (e.g. due to regulation or specification). For example, in LTE Rel-10/11 CA, if the UE determines that the total transmission power from multiple component carriers exceed the maximum uplink power limitation, power scaling based on certain algorithm is used to scale down the total power.

FIG. 6 shows a schematic diagram illustrating a first example procedure relating to concurrent uplink transmissions in an inter-site carrier aggregation scenario according to some example embodiments of the present invention.

As a precondition, in phase 0, a timing resource setting for uplink transmissions in/via the macro cell is established in the macro cell, i.e. at the macro eNB #A, and a timing resource setting for uplink transmissions in/via the micro cell is established in the micro cell, i.e. at the micro eNB #B. Further, it is assumed that the UE operates in the inter-site CA mode.

Then, a (UE-specific) restriction of time resources for an uplink transmission from the UE in the two cells is coordinated for the UE operating in the inter-site CA mode between the cells, i.e. their base stations, such that the time resources for an uplink transmission in the two cells are not concurrent, and the UE is scheduled for an uplink transmission in at least one of the two cells on the basis of the coordinated (UE-specific) time resource restriction.

The example procedure of FIG. 6 illustrates a case in which it is assumed that the macro cell initiates the aforementioned timing coordination between the two cells, i.e. that the macro cell represents a first cell and the micro cell represents a second cell. It is to be noted that such exemplary case is non-limiting but for the sake of simplicity only, while some embodiments of the present invention are also applicable with a different configuration, i.e. that the micro cell initiates the aforementioned timing coordination between the two cells. In such case, the subsequently described operations occur at the other eNB or in an opposite direction, respectively.

As shown in FIG. 6, in phase 1, the macro eNB #A sets a restricted amount of time resources for an uplink transmission from the UE in/via the macro cell. Then, in phase 2, the macro eNB #A signals the restricted amount of time resources for an uplink transmission from the UE in/via the macro cell to the micro cell, i.e. the micro eNB #B. Accordingly, in phase 3, upon obtaining the thus signaled restricted amount of time resources for an uplink transmission from the UE in/via the macro cell from the macro cell, the micro eNB #B sets a restricted amount of time resources for an uplink transmission from the UE in/via the micro cell on the basis thereof. In phase 4, which may be prior to, at the same time as, or after any one of phases 2 and 3, the macro eNB #A schedules the UE accordingly, i.e. on the basis of the time resource restriction for the macro cell.

Accordingly, as a result of such inter-cell uplink timing coordination, the time resources for an uplink transmission in/via the macro cell and the micro cell are not concurrent. Thereby, concurrent uplink transmissions of the UE in the inter-site CA mode are avoided, which could possibly exceed the maximum uplink power limitation.

According to some example embodiments of the present invention, the inter-cell uplink timing coordination may be performed as a basic configuration of the aggregated cells, i.e. irrespective or in advance of any specific operations in the macro and micro cells. Also, the inter-cell uplink timing coordination may be performed upon entry of the UE in the inter-site CA mode, upon an indication from the UE to at least one of the macro and micro cells, which is indicative of an exceedance of an uplink transmission power limitation by concurrent uplink transmissions on the aggregated carriers from the macro and micro cells at the UE (as described in the context of the procedure of FIG. 7 below), or upon any other event or the like, especially those which may be suitable to cause such inter-cell uplink timing coordination.

Accordingly, according to some example embodiments of the present invention, concurrent uplink transmissions in the aggregated cells may be handled on the basis of an inter-eNB coordination on uplink transmission time. In this regard, a time resource restriction (e.g. a subset of subframes) is used in uplink transmissions of one of the macro cell and the micro cell, and such restriction information is shared with the other one of the macro cell and the micro cell via some inter-eNB interface. The restricted amount of time resources for an uplink transmission from the UE in a first cell (e.g. the macro cell) may be derived on the basis of at least one of system information of the first cell, a radio resource configuration of the first cell, and a configuration of uplink control information for the first cell.

There may be various possible patterns of such time resource restriction such as e.g. the following.

The macro cell may inform the micro cell that it will restrict the uplink transmissions in a subset of uplink subframes, i.e. S_Macro_UL. For example, S_Macro_UL may consist of the first N uplink subframes in each M subframes, where N and M are positive integers. The restricted UL time resources S_Macro_UL, which may correspond to certain uplink HARQ processes, are reserved for macro cell uplink transmissions. For example, for FDD uplink subframes #k+8*n where k∈{0, 1, 2, 3, 4, 5, 6, 7} and n is positive integer can be reserved in each or a subset of all the radio frames. The restricted UL time resources S_Macro_UL can be derived based on some system information and/or radio resource configuration of the macro cell, e.g. the scheduling window of SIBs and/or a default paging cycle. For UEs in the micro cell, these will be scheduled for downlink from the macro cell only in the subframes determined by the scheduling window of SIBs, and/or subframes potentially dedicated for paging detection, and the corresponding uplink subframes for potential feedback can be considered as reserved for macro cell uplink use (for uplink control or uplink data transmission) and seen by the micro cell as S_Macro_UL.

Once the restricted UL time resources S_Macro_UL are shared with the micro cell, the micro cell can adjust its uplink or downlink scheduling to avoid uplink signal transmissions in these subframes. For example, the micro cell may avoid PDSCH scheduling in some downlink subframes, if the corresponding HARQ ACK feedback is in uplink subframes in S_Macro_UL. Another example is that the micro cell can avoid PUSCH scheduling in some uplink subframes, if the first transmission or retransmission of the same packet is in uplink subframes in S_Macro_UL.

Such (UE-specific) time resource restriction has limited impact to uplink scheduling in both cells, as typically the uplink traffic amount in/via the macro cell is quite small (as compared with the uplink traffic amount in/via the micro cell). From UE point of view, the thus determined and instructed scheduling from both cells is to be followed accordingly.

FIG. 7 shows a schematic diagram illustrating a second example procedure relating to concurrent uplink transmissions in an inter-site carrier aggregation scenario according to some example embodiments of the present invention.

As a precondition, in phase 0, it is assumed that the UE operates in the inter-site CA mode. In this regard, the UE is about to (arrange to) perform concurrent UL transmissions on the aggregated carriers in/via the macro and micro cells.

In phase 1, the UE determines exceedance of an uplink transmission power limitation by concurrent uplink transmissions on aggregated carriers from the macro cell and the micro cell. As a result of such determination, the UE drops an uplink transmission in one of the two cells, for example the micro cell, in phase 2. Upon drop of the uplink transmission in/via the micro cell, the micro eNB #B may detect the signal drop, e.g. by way of discontinuous transmission (DTX) detection.

Accordingly, an uplink signal dropping rule is predefined such that, e.g. when the UE determines that concurrent transmissions will occur and power scaling is needed to fulfill the maximum uplink transmission power limitation, the UE drops the micro cell uplink signal and only transmits the macro cell uplink signal.

Generally, before or upon actually performing the UL transmissions on the aggregated carriers in/via the macro and micro cells, the UE determines the total transmission power of such concurrent UL transmissions. If the UE determines that the total transmission power is within the uplink transmission power limitation, the UE may transmits both UL signals in/via the macro and micro cells. If the UE determines that the total transmission power exceeds the uplink transmission power limitation, the UE may scale the power of either one of the signals based on certain algorithm (e.g. considering that, in inter-eNB CA, the uplink date traffic in/via the macro cell is typically much less as compared with that in/via the micro cell, and most likely important control signals). For example, it can be predefined that the uplink signal of the macro cell is always given a higher priority when power scaling is determined to be necessary. In some embodiments, it can be predefined that the uplink signal of the micro cell is given a higher priority.

According to some example embodiments of the present invention, if the UE determines that the total transmission power exceeds the uplink transmission power limitation, the UE drops the uplink signal for the micro cell and only transmits the uplink signal for the macro cell. In this case, the uplink signal detection performance in the macro cell is optimal, and the micro eNB in the micro cell can detect such signal dropping via DTX detection.

By virtue of some example embodiments of the present invention, as explained above, UCI configuration procedures in a micro cell of aggregated cells can be handled in an inter-site carrier aggregation scenario, and concurrent uplink transmissions of aggregated macro and micro cells can be handled in an inter-site carrier aggregation scenario without any layer 1 based coordination. Accordingly, some example embodiments of the present invention are useful for an inter-site carrier aggregation scenario, in which macro and micro cell base stations are located at different sites and are connected by a backhaul link, such as a non-fiber connection, exhibiting a non-negligible delay, e.g. of more than 1 millisecond.

Generally, the above-described procedures and functions may be implemented by respective functional elements, processors, or the like, as described below.

While in the foregoing some example embodiments of the present invention are described mainly with reference to methods, procedures and functions, corresponding example embodiments of the present invention also cover respective apparatuses, network nodes and systems, including both software and/or hardware thereof.

Respective some example embodiments of the present invention are described below referring to FIG. 8, while for the sake of brevity reference is made to the detailed description with regard to FIGS. 1 to 7.

Figure 8:
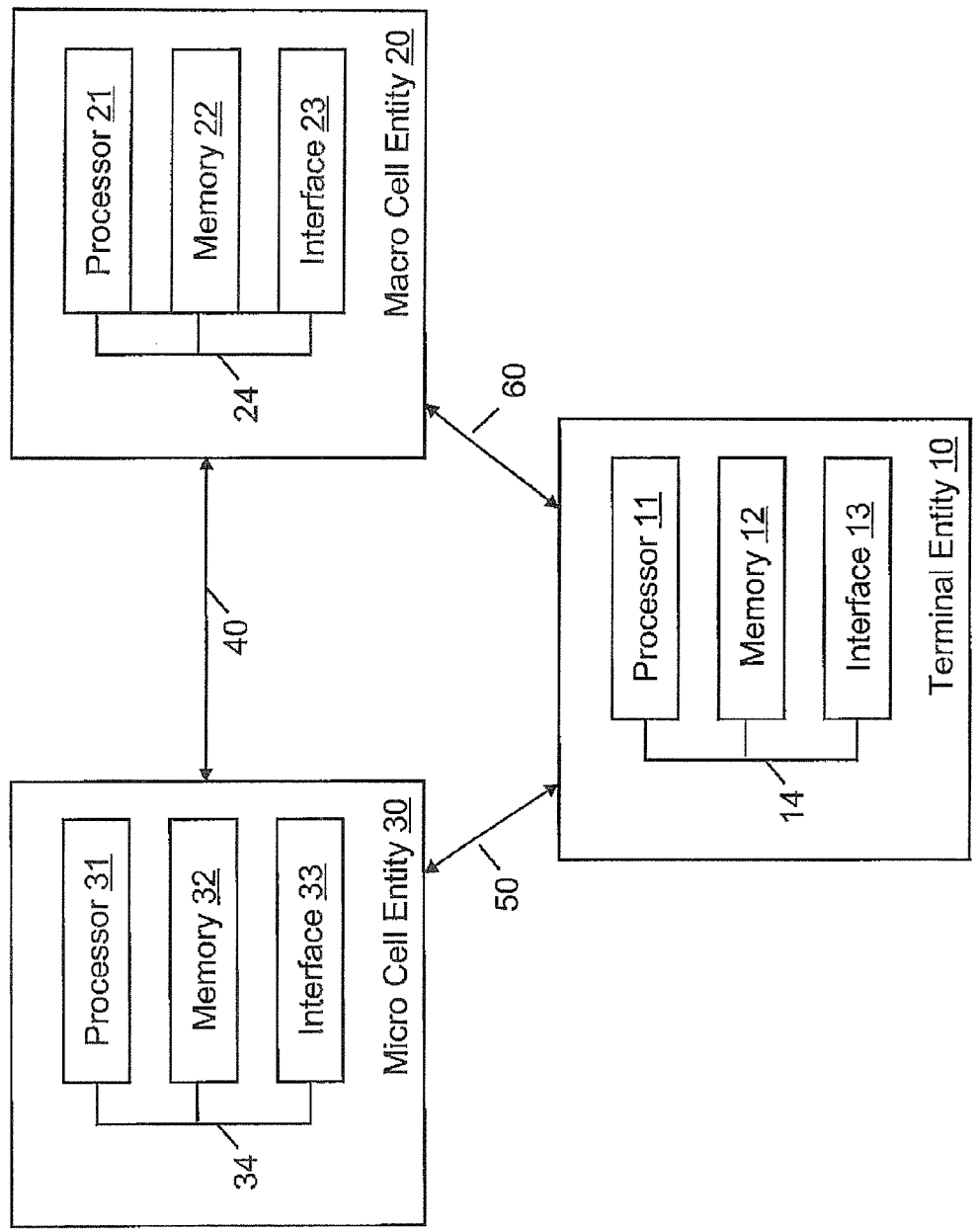
FIG. 8 shows a schematic block diagram illustrating example apparatuses according to some example embodiments of the present invention.

In FIG. 8 below, which is noted to represent a simplified block diagram, the solid line blocks are basically configured to perform respective operations as described above. The entirety of solid line blocks are basically configured to perform the methods and operations as described above, respectively. With respect to FIG. 8, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows and lines interconnecting individual blocks are meant to illustrate an operational coupling there-between, which may be a physical and/or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIG. 8, only those functional blocks are illustrated, which may relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 8 shows a schematic block diagram illustrating example apparatuses according to some example embodiments of the present invention.

In view of the above, the thus described apparatuses 10, 20 and 30 are suitable for use in practicing example embodiments of the present invention, as described herein. The thus described apparatus 10 corresponds to an entity which may represent a (or part of a) terminal device such as a UE or a corresponding modem (which may be installed as part thereof, but may be also a separate module, which can be attached to various devices, as described above), and may be configured to perform a procedure and/or functionality as described in conjunction with any one of FIGS. 2 to 4, 6 and 7. The thus described apparatus 20 corresponds to an entity which may represent a (or part of a) macro cell or macro cell base station such as an eNB or a corresponding modem (which may be installed as part thereof, but may be also a separate module, which can be attached to various devices, as described above), and may be configured to perform a procedure and/or functionality as described in conjunction with any one of FIGS. 2 to 7. The thus described apparatus 30 corresponds to an entity which may represent a (part of a) micro cell or micro cell base station such as an eNB or a corresponding modem (which may be installed as part thereof, but may be also a separate module, which can be attached to various devices, as described above), and may be configured to perform a procedure and/or functionality as described in conjunction with any one of FIGS. 2 to 7.

Generally, any apparatus according to some example embodiments of the present invention may comprise at least one processor, at least one memory including computer program code, and at least one interface configured for communication with at least another apparatus.

As indicated in FIG. 8, according to some example embodiments of the present invention, each of the apparatuses comprises one or more processor(s) 11/21/31, one or more memories 12/22/32 and one or more interface(s) 13/23/33, which are connected by a bus 14/24/34 or the like, and the apparatuses may be connected via corresponding links or connections or interfaces 40/50/60, respectively. As is evident from the scenario of FIG. 1, the link or connection 40 represents a backhaul link, e.g. a non-ideal backhaul link, which may be a wire line of non-fiber type, and the links or connections or interfaces 50 and 60 represent radio connections.

The processor(s) 11/21/31 and/or the interface(s) 13/23/33 may be facilitated for communication over a (hardwire or wireless) link, respectively. The interface(s) 13/23/33 may comprise a suitable receiver or a suitable transmitter-receiver combination or transceiver, which is coupled to one or more antennas or communication means for (hardwire or wireless) communications with the linked or connected device(s), respectively. The interface 13/23/33(s) may be generally configured to communicate with another apparatus, i.e. the interface thereof, The memory/memories 12/22/32 may store respective programs assumed to include program instructions or computer program code that, when executed by the respective processor, enables the respective electronic device or apparatus to operate in accordance with example embodiments of the present invention. For example, the memory/memories 22/32 of the apparatus 20/30 may store corresponding settings of the respective cell, and the memory/memories 12 of the apparatus 10 may store configurations of the inter-site CA mode.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

In a variant of the apparatus 10, the processor (i.e. the at least one processor 11, with the at least one memory 12 and the computer program code) is configured to obtain, in a macro cell located at a first site, configuration of uplink control information for the macro cell and configuration information for a micro cell located at a second site, and configure an inter-site carrier aggregation mode on the basis of the obtained configuration of uplink control information for the macro cell and the obtained configuration information for the micro cell. Stated in other words, in a variant, the apparatus 10 comprises means for obtaining, in a macro cell located at a first site, configuration of uplink control information for the macro cell and configuration information for a micro cell located at a second site, and means for configuring an inter-site carrier aggregation mode on the basis of the obtained configuration of uplink control information for the macro cell and the obtained configuration information for the micro cell.

In another variant of the apparatus 10, the processor (i.e. the at least one processor 11, with the at least one memory 12 and the computer program code) is configured to determine exceedance of an uplink transmission power limitation by concurrent uplink transmissions on aggregated carriers from a first cell located at a first site and the second cell located at a second cell in an inter-site carrier aggregation mode in which carriers from the first cell and the second cell are aggregated for uplink communication, and drop an uplink transmission in one of the first and second cells. Stated in other words, in another variant, the apparatus 10 comprises means for determining exceedance of an uplink transmission power limitation by concurrent uplink transmissions on aggregated carriers from a first cell located at a first site and the second cell located at a second cell in an inter-site carrier aggregation mode in which carriers from the first cell and the second cell are aggregated for uplink communication, and means for dropping an uplink transmission in one of the first and second cells.

In a variant of the apparatus 20, the processor (i.e. the at least one processor 21, with the at least one memory 22 and the computer program code) is configured to set a configuration of uplink control information for a macro cell located at a first site, and signal, in/via the macro cell, the configuration of uplink control information for the macro cell and configuration information for a micro cell located at a second site to a terminal device for an inter-site carrier aggregation mode in which carriers from the macro cell and the micro cell are aggregated for uplink communication. Stated in other words, in a variant, the apparatus 20 comprises means for setting a configuration of uplink control information for a macro cell located at a first site, and means for signaling, in/via the macro cell, the configuration of uplink control information for the macro cell and configuration information for a micro cell located at a second site to a terminal device for an inter-site carrier aggregation mode in which carriers from the macro cell and the micro cell are aggregated for uplink communication.

In a variant of the apparatus 30, the processor (i.e. the at least one processor 31, with the at least one memory 32 and the computer program code) is configured to set a configuration of uplink control information for a micro cell located at a second site, and signal the configuration of uplink control information for the micro cell for configuring a terminal device for an inter-site carrier aggregation mode in which carriers from a macro cell located at a first site and the micro cell are aggregated for uplink communication. Stated in other words, in another variant, the apparatus 30 comprises means for setting a configuration of uplink control information for a micro cell located at a second site, and means for signaling the configuration of uplink control information for the micro cell for configuring a terminal device for an inter-site carrier aggregation mode in which carriers from a macro cell located at a first site and the micro cell are aggregated for uplink communication.

In another variant of the apparatus 30 or 40, the processor (i.e. the at least one processor 31/41, with the at least one memory 32/42 and the computer program code) is configured to coordinate restriction of time resources for an uplink transmission from a terminal device in a first cell located at a first site and a second cell located at a second site for the terminal device operating in an inter-site carrier aggregation mode, in which carriers from the first cell and the second cell are aggregated for uplink communication, such that the time resources for an uplink transmission in the first and second cells are not concurrent, and schedule the terminal device for an uplink transmission in at least one of the first and second cells on the basis of the coordinated time resource restriction. Stated in other words, in another variant, the apparatus 30 or 40 comprises means for coordinating restriction of time resources for an uplink transmission from a terminal device in a first cell located at a first site and a second cell located at a second site for the terminal device operating in an inter-site carrier aggregation mode, in which carriers from the first cell and the second cell are aggregated for uplink communication, such that the time resources for an uplink transmission in the first and second cells are not concurrent, and means for scheduling the terminal device for an uplink transmission in at least one of the first and second cells on the basis of the coordinated time resource restriction.

For further details of specifics regarding functionalities according to some example embodiments of the present invention, reference is made to the foregoing description in conjunction with FIGS. 1 to 7.

According to some example embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any structural means such as a processor or other circuitry may refer to one or more of the following: (a) hardware-only circuit implementations (such as implementations in only analog and/or digital circuitry) and (b) combinations of circuits and software (and/or firmware), such as (as applicable): (i) a combination of processor(s) or (ii) portions of processor(s)/software (including digital signal processor(s)), software, and memory(ies) that work together to cause an apparatus, such as a mobile phone or server, to perform various functions) and (c) circuits, such as a microprocessor(s) or a portion of a microprocessor(s), that require software or firmware for operation, even if the software or firmware is not physically present. Also, it may also cover an implementation of merely a processor (or multiple processors) or portion of a processor and its (or their) accompanying software and/or firmware, any integrated circuit, or the like.

Generally, any procedural step or functionality is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, system in package, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, some examples of the present invention provide measures for uplink configuration and transmission control in inter-site carrier aggregation. Such measures may exemplarily comprise measures for controlling configuration of a terminal device for an inter-site carrier aggregation mode, in which carriers from a macro cell and a micro cell are aggregated for uplink communication, with a configuration of uplink control information for the macro cell located at a first site and a configuration of uplink control information for the micro cell located at a second site, and/or measures for controlling transmission of a terminal device in the inter-site carrier aggregation mode with a handling of concurrent uplink transmissions at the terminal device.

Even though some examples of the present invention are described above with reference to the examples according to the accompanying drawings, it is to be understood that they are not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP Third Generation Partnership Project
ACK Acknowledgement
CA Carrier Aggregation
CC Component Carrier
CSI Channel State Information
DL Downlink
DTX Discontinuous Transmission
eNB evolved Node B (E-UTRAN base station)
E-UTRAN Evolved UTRAN
FDD Frequency Division Duplex
HARQ Hybrid Automatic Repeat reQuest
LTE Long Term Evolution
LTE-A Long Term Evolution Advanced
PDCCH Physical Downlink Control CHannel
PDSCH Physical Downlink Shared CHannel
PUCCH Physical Uplink Control Channel
PUSCH Physical Uplink Shared Channel
RRC Radio Resource Control
SIB System Information Block
UCI Uplink Control Information
UE User Equipment
UL Uplink
UMTS Universal Mobile Telecommunications System
UTRAN UMTS Terrestrial Radio Access Network

What is claimed is:

1. A method comprising
setting, by a base station of a macro cell, a configuration of uplink control information for the macro cell located at a first site; and
signaling, via the macro cell, the configuration of uplink control information for the macro cell and configuration information for a micro cell located at a second site to a terminal device for an inter-site carrier aggregation mode in which carriers from the macro cell and the micro cell are aggregated for uplink communication, wherein
the signaling comprises an indication for the terminal device to obtain a configuration of uplink control information for the micro cell in the micro cell, and
the configuration information for the micro cell comprises system information of the micro cell.

2. The method according to claim 1, wherein
the signaling is performed upon entry of the terminal device in the inter-site carrier aggregation mode.

3. The method according to claim 2, wherein the entry of the terminal device in the inter-site carrier aggregation mode comprises:
detecting connection of the terminal device to the macro cell;
detecting connectability of the terminal device to the micro cell;
determining allowability of inter-site carrier aggregation mode for the terminal device with the micro cell; and
instructing, via the macro cell, the terminal device to enter the inter-site carrier aggregation mode.

4. The method according to claim 1, further comprising:
obtaining configurations of uplink control information for micro cells from a plurality of micro cells;
optimizing the configurations of uplink control information for the micro cells in terms of minimizing uplink interference among the micro cells; and
signaling recommendation of optimized configurations of uplink control information for the micro cells to the micro cells.

5. The method according to claim 1, wherein
the base station of the macro cell and a base station of the micro cell are connected via a backhaul link.

6. A base station comprising:
processing circuitry configured to set a configuration of uplink control information for a macro cell served by the base station located at a first site; and
a communication interface configured to signal, via the macro cell, the configuration of uplink control information for the macro cell and configuration information for a micro cell located at a second site to a terminal device for an inter-site carrier aggregation mode in which carriers from the macro cell and the micro cell are aggregated for uplink communication, wherein
the signaling comprises an indication for the terminal device to obtain a configuration of uplink control information for the micro cell in the micro cell, and
the configuration information for the micro cell comprises system information of the micro cell.

7. The base station according to claim 6, wherein the processing circuitry is configured to cause the base station to perform the signaling upon entry of the terminal device in the inter-site carrier aggregation mode.

8. The base station according to claim 7, wherein the processing circuitry is configured to cause the base station, for the entry of the terminal device in the inter-site carrier aggregation mode, to perform:
detecting connection of the terminal device to the macro cell;
detecting connectability of the terminal device to the micro cell;
determining allowability of inter-site carrier aggregation mode for the terminal device with the micro cell; and
instructing, via the macro cell, the terminal device to enter the inter-site carrier aggregation mode.

9. The base station according to claim 6, wherein the processing circuitry is configured to cause the base station to perform:
obtaining configurations of uplink control information for micro cells from a plurality of micro cells;
optimizing the configurations of uplink control information for the micro cells in terms of minimizing uplink interference among the micro cells; and
signaling recommendation of optimized configurations of uplink control information for the micro cells to the micro cells.

10. The base station according to claim 6, wherein
the base station of the macro cell and a base station of the micro cell are connected via a backhaul link.

11. The method according to claim 1, wherein
the uplink control information comprises a parameter corresponding to a physical uplink control channel.

12. The method according to claim 1, wherein
the uplink control information comprises a parameter corresponding to a periodic channel state information mode.

13. The method according to claim 1, wherein the uplink control information comprises a parameter corresponding to an acknowledgment mode of a hybrid automatic repeat request.

14. The base station according to claim 6, wherein the uplink control information comprises a parameter corresponding to a physical uplink control channel.

15. The base station according to claim 6, wherein the uplink control information comprises a parameter corresponding to a periodic channel state information mode.

16. The base station according to claim 6, wherein the uplink control information comprises a parameter corresponding to an acknowledgment mode of a hybrid automatic repeat request.

17. A base station comprising:
circuitry configured to set a configuration of uplink control information for a macro cell served by the base station; and
a communication interface configured to signal, to a terminal device, the configuration of uplink control information for the macro cell, configuration information for a micro cell including system information of the micro cell, and an indication for the terminal device to obtain a configuration of uplink control information for the micro cell in the micro cell.

18. The base station of claim 17, wherein the circuitry is configured to coordinate an inter-site carrier aggregation mode for the terminal device in which carriers from the macro cell and the micro cell are aggregated for uplink communication.

19. The base station of claim 18, wherein the circuitry is configured to cause the communication to perform the signaling upon entry of the terminal device in the inter-site carrier aggregation mode.

20. The base station of claim 17, wherein the circuitry is configured to:
obtain configurations of uplink control information for micro cells from a plurality of micro cells;
optimize the configurations of uplink control information for the micro cells to minimize uplink interference among the micro cells; and
signal a recommendation of optimized configurations of uplink control information for the micro cells to the micro cells.

* * * * *